United States Patent [19]

Maucksch et al.

[11] Patent Number: 4,977,607
[45] Date of Patent: Dec. 11, 1990

[54] METHOD OF GENERATING AN RF SIGNAL MODULATED BY A MESSAGE SIGNAL AND DISTORTED BY A PREDETERMINED FADING PROFILE FOR TESTING RF RECEIVERS, AND APPARATUS FOR CARRYING OUT THE METHOD INCLUDING A FADING SIMULATOR

[75] Inventors: Thomas Maucksch, Ostermünchen; Gottfried Holzmann, Ebersberg; Frank Körber, Gröbenzell, all of Fed. Rep. of Germany

[73] Assignee: Rohde & Schwarz GmbH & Co., Fed. Rep. of Germany

[21] Appl. No.: 443,486

[22] Filed: Nov. 30, 1989

[30] Foreign Application Priority Data

Dec. 1, 1988 [DE] Fed. Rep. of Germany ....... 3840498

[51] Int. Cl.$^5$ ............................................ H04B 15/00
[52] U.S. Cl. .................................... 455/10; 455/52; 455/63; 455/65; 455/67
[58] Field of Search ................. 375/10, 60; 455/10, 455/52, 67, 226, 63, 65

[56] References Cited

U.S. PATENT DOCUMENTS

| 4,669,091 | 5/1987 | Nossen | 455/65 |
| 4,679,248 | 7/1987 | McKeown | 455/65 |
| 4,696,017 | 9/1987 | Masheff et al. | 375/60 |
| 4,806,881 | 2/1989 | Ives et al. | 455/102 |

OTHER PUBLICATIONS

"A Multipath Fading Simulator for Mobile Radio", Arredondo, et al., IEEE Transactions on Vehicular Technology, 5/16/73.

Primary Examiner—Reinhard J. Eisenzopf
Assistant Examiner—Lisa Charouel
Attorney, Agent, or Firm—Hill, Van Santen, Steadman & Simpson

[57] ABSTRACT

For generating an RF signal modulated by a message and distorted by a predetermined fading profile for testing RF receivers, a sequence of digital phase and amplitude values which corresponds to the message modulation is arithmetically processed by a predetermined fading profile and stored in memory, and an RF carrier is amplitude and phase modulated by the stored values to produce a testing signal for the RF receivers.

3 Claims, 2 Drawing Sheets

METHOD OF GENERATING AN RF SIGNAL MODULATED BY A MESSAGE SIGNAL AND DISTORTED BY A PREDETERMINED FADING PROFILE FOR TESTING RF RECEIVERS, AND APPARATUS FOR CARRYING OUT THE METHOD INCLUDING A FADING SIMULATOR

BACKGROUND OF THE INVENTION

1. Field of the Invention:

The present invention relates to a method of generating an RF signal modulated by a message signal and distorted by a predetermined fading profile for testing RF receivers and to a fading simulator for performing the method.

2. Description of the Prior Art

Dispersion phenomena due to multipath distribution in a radio channel lead to so-called fading phenomena at the input of a radio receiver. For the purpose of testing radio receivers in a laboratory under practical conditions, such fading phenomena are produced artificially in a so-called fading simulator. With the conventional fading simulators, the fading phenomena of the radio channel are real-time simulated. The RF signal which is ideally amplitude and/or phase modulated by a message is applied to the input of the fading simulator and this modulated RF signal is baseband converted in the simulator and subsequently subjected to analog-to-digital (A/D) conversion and split into a multiplicity of parallel paths such that an individual path delay and amplitude weighting are formed for each individual path and each path is processed with a non-linear operand for introducing phase and amplitude fluctuations. Thereafter, the individual paths are composed again and the values thus obtained are reconverted into the radio frequency range. In this manner, the phase and amplitude characteristics which correspond to the modulation ar converted into phase and amplitude characteristics which reflect both the modulation and the influence of fading by the radio channel. Known fading simulators require the provision of considerable apparatus and are therefore very expensive. A high signal processing rate is required for a broadband section of the simulated radio channel, whereby the apparatus effort is still more increased due to the necessity for high computing rates.

SUMMARY OF THE INVENTION

It is therefore the object of the present invention to provide a method of generating such a fading profile-distorted test RF signal for receivers in which the method can be performed with considerably more simple apparatus and also a correspondingly simple and inexpensive fading simulator is to be provided.

The above object is achieved, according to the present invention, in a method of generating an RF signal modulator by a message signal and distorted by a predetermined fading profile, for testing RF receivers, which is particularly characterized in that a sequence of digital phase and amplitude values corresponding to the message signal is arithmetically processed by a predetermined fading profile and is stored in memories, and an RF carrier is amplitude and phase modulated by the stored phase and amplitude information.

According to a feature of the invention, the method is characterized in that for plural different message signals, correspondingly different fading profile-processed phase and amplitude values are generated and are separately stored in memories to be selectively retrieved for modulating the RF carrier.

Also according to the invention, a fading simulator is provided for performing the method and is particularly characterized by two digital memories in which the fading profile-processed digital phase and amplitude values of the message signal are separately stored and which are connected via digital-to-analog converters to a digital modulator to which a carrier including the frequency of the desired testing RF signal is supplied and the output of which can be coupled to the input of a receiver to be tested.

In the method according to the present invention, the RF signal modulated by the message is no longer real-time processed, but the predetermined amplitude and phase values of the message, which is to be modulated on the RF signal for testing the receiver, are processed with the desired fading profile in an arithmetic process. To this end, an ordered sequence of phase and amplitude values corresponding to the message modulation is fed as a data record to a computer in which the series of values is processed with known computing rules resulting from the desired fading profile. The phase and amplitude value so obtained are then stored sequentially as setting values in discrete memories. If required, the setting values are retrieved from the memories at a speed which corresponds to natural conditions, and an RF carrier is then correspondingly set thereby in respect of phase and amplitude. The amount of apparatus for performing the method according to the invention is extremely small, and therefore a fading simulator suitable for performing the method can be designed at low cost. It is merely required for the method of the invention that the message to be transmitted is previously known, and continuous operation is not necessary, because with the method of the invention the period of message transmission is limited by the available storage space so that only a limited-length message packet is available for receiver testing. Since the method of the invention is not performed in real-time fashion but the fading-processed phase and amplitude values are prepared and established prior to the actual testing operation so that there is as much time available as desired, the apparatus expense is minimum and a simple desktop computer will suffice.

Additionally, the method according to the present invention offers the advantage that it is also possible to test RF receivers which operate on the frequency-hopping principle; with the conventional fading simulators this is possible only to a limited extent because they have a limited bandwidth of, for example, only 5 MHz. In practicing the method of the invention it is possible with the frequency hopping sequence being known beforehand to include the influence of the frequency hop directly in the computation of the phase and amplitude values, and any desired hopping bandwidth is possible without additional apparatus.

Moreover, in the method of the invention, fluctuation phenomena are known in detail at any time and therefore fluctuation phenomena can be described not only by their statistical values, but their course of time is always accurately known so that accurately reproducible measurement results can be made.

The method of the invention can be used for any desired modes of message modulation, for pure phase or frequency modulation of an RF carrier by the predetermined message, or for pure amplitude modulation or, if applicable, also for combined phase and amplitude modulation.

BRIEF DESCRIPTION OF THE DRAWING

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
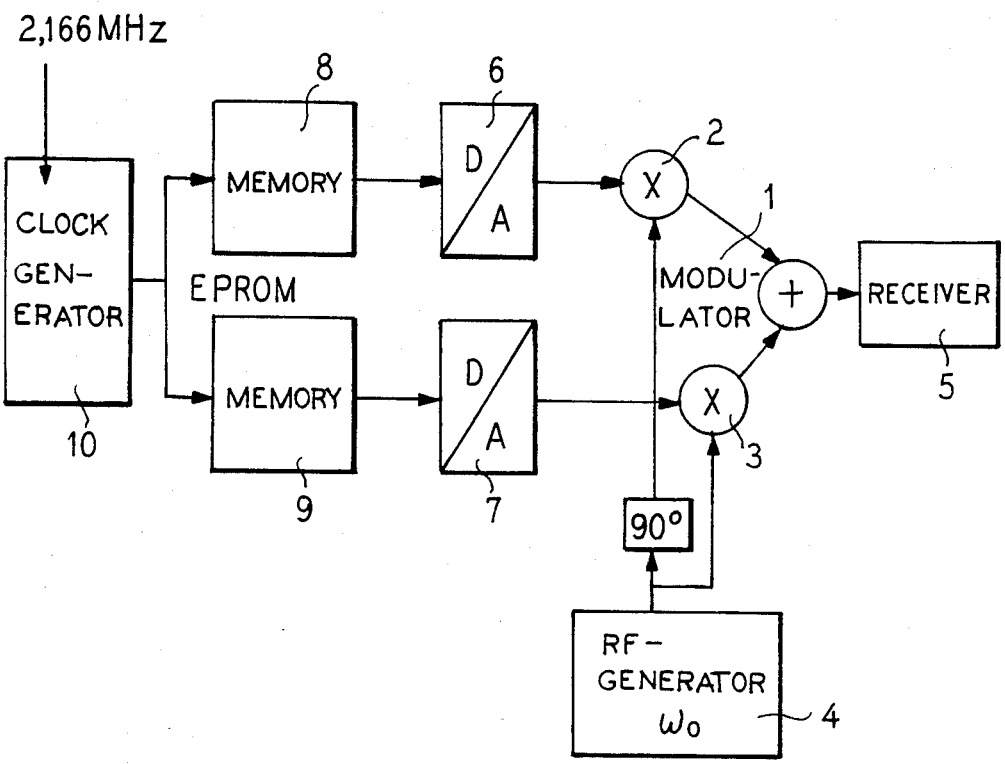
FIG. 1 illustrates a basic circuit diagram of a fading simulator operating in accordance with the method of the present invention.

Referring to FIG. 1, a basic circuit diagram of a fading simulator operating in accordance with the method of the present invention is shown comprising a digital modulator 1 including two mixers 2 and 3 driven from a carrier frequency generator 4 with a mutual phase shift of 90° with a carrier frequency by which of which an RF receiver 5 is to be tested for utility under predetermined fading conditions. The mixers 2 and 3 are driven through digital-to-analog (D/A) converters 6 and 7 by the complex amplitude and phase components I and Q of a modulation signal, the components being stored in two digital memories 8 and 9 (EPROM memories) and being retrievable by way of a clock generator 10 upon receiver testing. Together, the memories 8 and 9 have a storage capacity of, for example, 3 Mbits. The clock generator 10 reads out an I value and a Q value from the memories 8 and 9 at a clock frequency of, for example, 2.166 MHz, i.e. every 461.5 ns, which corresponds to a signal processing bandwidth of approximately 1 MHz. At a word period of 2·12=24 bits for the memories 8 and 9, the available cycle time is therefore 60.49 ms, i.e. with a predetermined memory capacity a modulated RF carrier is available for approximately 60 ms for receiver testing under fading conditions. This is sufficient for nearly all receiver testing operations.

Figure 2:
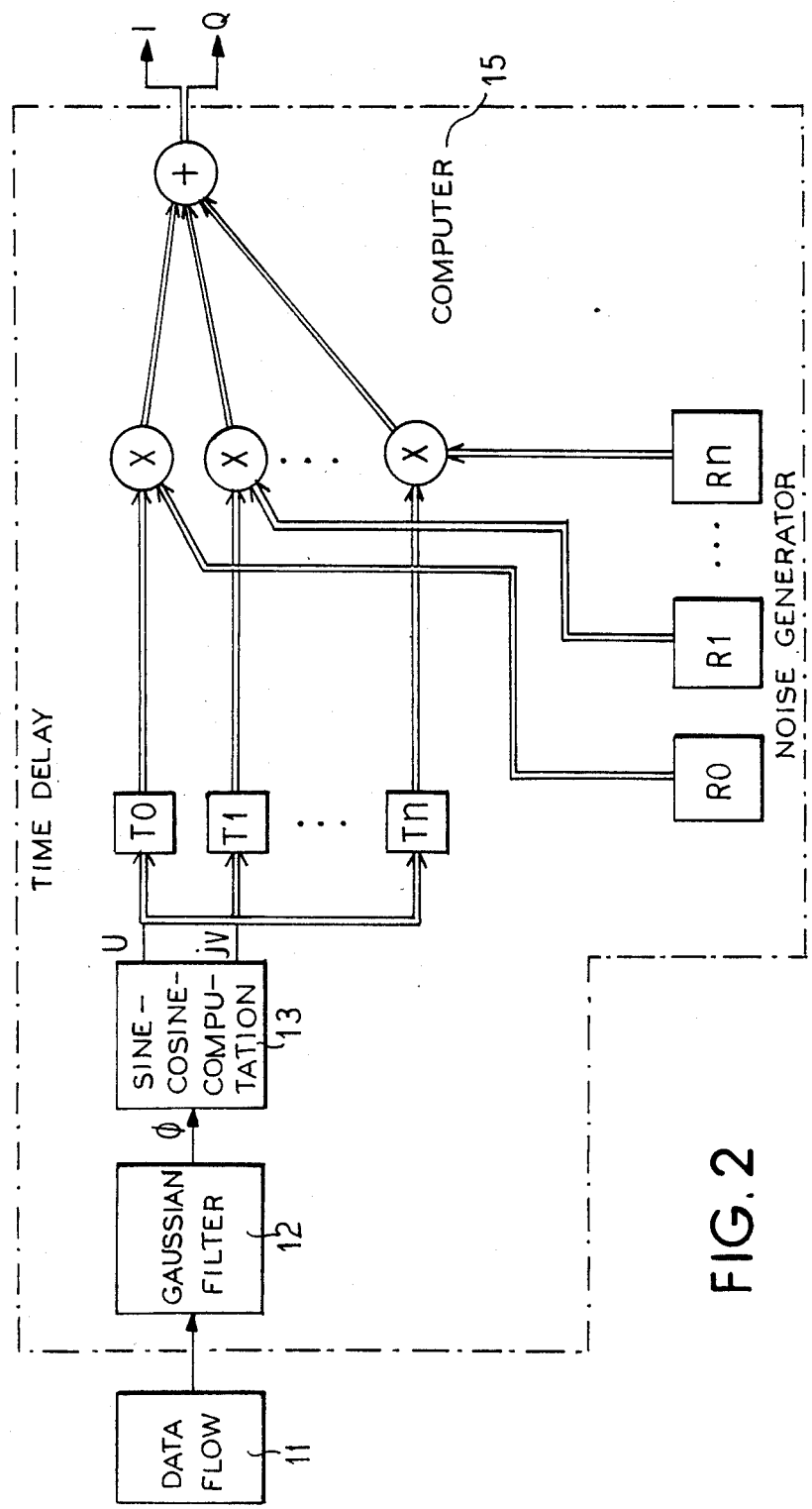
FIG. 2 is a schematic representation of the computation of the amplitude and phase values used in the apparatus of FIG. 1.

FIG. 2 is a schematic illustration of the computation of the amplitude and phase values I and Q stored in the memories 8 and 9. In the example shown in FIG. 2, purely phase modulation is assumed. The serial digital data flow 11 (the message to be phase modulated on a carrier), which data flow is limited to 60 ms, for example, is fed to a computer 15 in which the following arithmetic operations are performed.

In the example, a known GMSK modulator (phase modulator with a Gaussian filter for minimum shift keying) is to be used in which the serial data flow initially passes through a so-called Gaussian filter 12, whereby the phase information is obtained by integration and digital filtering, the phase information being then arithmetically converted by a sine/cosine computation 13 into the complex digital amplitude and phase values u and jv. These complex components u and jv are then arithmetically processed again as known per se with a predetermined fading profile, wherein an arithmetic subdivision into several arithmetic paths is made. In each of the arithmetic paths, the signal is delayed by a predetermined time $t_o$ to $t_n$ while at the same time it is multiplied by a complex noise signal represented by the noise generator operands $r_o$ to $r_n$. This arithmetic paths are processed sequentially, and it is only for the sake of clarity that they are illustrated as parallel arithmetic paths in FIG. 2. Of course, the noise generators likewise are but corresponding computing programs of the computer 15. The noise generators additionally consider arithmetically the desired Doppler frequency and the respective desired shape of terrain of the fading profile to be considered. The Doppler frequency results from the speed of a simulated vehicle in which the tested receiver 5 is mounted. In order to restrict the variety of terrain shapes which naturally exist, a limited number of predetermined terrain shapes is established such as flat rural terrain, hilly terrain, town or the like. The products of the individual arithmetic paths are finally added and input into the memories 8 and 9 as complex amplitude and phase values I and Q. The arithmetic evaluation of the digital amplitude and phase values u and jv of the modulated information, which has been modulated in ideal and uncorrupted fashion with the message, is therefore converted by the method of the present invention into a sequence of amplitude and phase values I and Q in a computer, i.e. purely arithmetically, and these values comprise both the modulation and the desired fading characteristic.

When a receiver 5 (FIG. 1) is to be tested with a predetermined fading profile, a time-limited message to be modulated is fading processed in accordance with the arithmetic principle set forth in FIG. 2 and the corresponding complex values are stored in the memories 8 and 9 as set forth above. For testing the receiver, the stored I-Q result which comprises both the modulation of the message and the fading simulation is merely retrieved from the memories 8 and 9 and the RF carrier, which is selected in accordance with the desired testing frequency, is modulated thereby and is then supplied to the receiver input. When the receiver is capable of correctly processing the digital modulation signal, which is more or less distorted by the fading simulation, the receiver functions properly. Hence, any receiver can be tested in accordance with the foregoing principle as to its performance under certain different fading conditions. When the messages intended for certain receiver tests are known and are to be used repeatedly, it is advantageous to store the corresponding modulation values beforehand in the memories 8 and 9 and to retrieve from the memories only the fading profile-processed modulation values desired for testing and required, whereby the testing time for receivers can still further be reduced.

In the case of digital radio networks it is often necessary to test a receiver while a second, lower-level transmitter is operative at the same carrier frequency. The receiver must be capable of suppressing the signal from the second transmitter and of properly recognizing the message from the actual message transmitter. With the method according to the present invention, no additional fading simulator is required for the second transmitter. According to the invention, the second signal may simply be included in the computation of the phase and amplitude values, which will not require any additional expense.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method of generating an RF signal modulated by a message signal and distorted by a predetermined fading profile for testing RF receivers, the improvement comprising the steps of:
   arithmetically processing a sequence of digital phase and amplitude values corresponding to a message signal by a predetermined fading profile;
   storing the processed sequence; and
   amplitude and phase modulating and RF carrier with the stored sequence of fading profile-processed phase and amplitude values.

2. The improved method of claim 1, for plural different message signals, and further defined as:
   generating different profile-processed phased and amplitude values; and
   separately storing the generated value in memories for selective retrieval for modulating the RF carrier.

3. In a fading simulator for performing a method of generating an RF signal modulated by a message signal and distorted by a predetermined fading profile for testing RF receivers in which a sequence of digital phase and amplitude values corresponding to a message signal is arithmetically processed by a predetermined fading profile and is stored in memories, and in which an RF carrier is amplitude and phase modulated by the stored values, the improvement comprising:
   memory means separately storing the fading profile-processed digital phase and amplitude values;
   digital-to-analog converters connected to said memories;
   a digital modulator connected to said digital-to-analog converters;
   an RF carrier generator for generating a carrier including the frequency of a desired testing RF signal connected to said digital modulator; and
   means for operating said memories to cause said digital modulator to modulate said carrier with said stored phase and amplitude values to produce a testing signal for connection to an RF receiver.

* * * * *